US010338967B2

(12) United States Patent
Duttagupta et al.

(10) Patent No.: US 10,338,967 B2
(45) Date of Patent: Jul. 2, 2019

(54) SYSTEMS AND METHODS FOR PREDICTING PERFORMANCE OF APPLICATIONS ON AN INTERNET OF THINGS (IOT) PLATFORM

(71) Applicant: Tata Consultancy Services Limited, Mumbai (IN)

(72) Inventors: Subhasri Duttagupta, Mumbai (IN); Mukund Kumar, Mumbai (IN); Manoj Karunakaran Nambiar, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 97 days.

(21) Appl. No.: 15/410,178

(22) Filed: Jan. 19, 2017

(65) Prior Publication Data
US 2018/0081730 A1 Mar. 22, 2018

(30) Foreign Application Priority Data
Sep. 20, 2016 (IN) .............................. 201621032118

(51) Int. Cl.
 *G06F 9/455* (2018.01)
 *G06F 9/50* (2006.01)
 *G06F 11/34* (2006.01)
(52) U.S. Cl.
 CPC ........ *G06F 9/5027* (2013.01); *G06F 9/45558* (2013.01); *G06F 11/3419* (2013.01);
 (Continued)
(58) Field of Classification Search
 None
 See application file for complete search history.

(56) References Cited

U.S. PATENT DOCUMENTS

2016/0323143 A1* 11/2016 Kim ....................... G06F 9/441
2017/0339630 A1* 11/2017 Ketonen ............... H04W 48/16
(Continued)

OTHER PUBLICATIONS

Duttagupta et al, Performance Prediction of IoT Application—an Experimental Analysis, ACM, 2016, 9 pages.*
(Continued)

*Primary Examiner* — Diem K Cao
(74) *Attorney, Agent, or Firm* — Finnegan, Henderson, Farabow, Garrett & Dunner LLP

(57) ABSTRACT

Performance prediction systems and method of an Internet of Things (IoT) platform and applications includes obtaining input(s) comprising one of (i) user requests and (ii) sensor observations from sensor(s); invoking Application Programming Interface (APIs) of the platform based on input(s); identifying open flow (OF) and closed flow (CF) requests of system(s) connected to the platform; identifying workload characteristics of the OF and CF requests to obtain segregated OF and segregated CF requests, and a combination of open and closed flow requests; executing performance tests with the APIs based on the workload characteristics; measuring resource utilization of the system(s) and computing service demands of resource(s) from measured utilization, and user requests processed by the platform per unit time; executing the performance tests with the invoked APIs based on volume of workload characteristics pertaining to the application(s); and predicting, using queuing network, performance of the application(s) for the volume of workload characteristics.

18 Claims, 9 Drawing Sheets

(52) U.S. Cl.
CPC ...... *G06F 11/3428* (2013.01); *G06F 11/3438* (2013.01); *G06F 11/3447* (2013.01); *G06F 11/3457* (2013.01)

(56) References Cited

U.S. PATENT DOCUMENTS

2018/0047074 A1* 2/2018 Cronin .................. G06Q 10/00
2018/0054472 A1* 2/2018 Greenspan .............. H04L 67/10

OTHER PUBLICATIONS

Lawson, C.L. et al. (1995). Solving Least Squares Problems. R. E. O'Malley ed., Society for Industrial and Applied Mathematics, pp. vii-337.
Kuć, R. et al. (2016). Elasticsearch Server: Third Edition: Leverage Elasticsearch to create a robust, fast, and flexible search solution with ease. N. Bagban et al. ed., Packt Publishing Ltd., pp. i-521.
Lazowska, E.D. et al. (1994). Quantitative System Performance: Computer System Analysis Using Queueing Network Models. N. Milnamow ed., Prentice-Hall, Inc., pp. v-417.

* cited by examiner (a) PostObservation (b) GetObservation

SYSTEMS AND METHODS FOR PREDICTING PERFORMANCE OF APPLICATIONS ON AN INTERNET OF THINGS (IOT) PLATFORM

PRIORITY CLAIM

This U.S. patent application claims priority under 35 U.S.C. § 119 to: India Application No. 201621032118, filed on Sep. 20, 2016. The entire contents of the aforementioned application are incorporated herein by reference.

TECHNICAL FIELD

This disclosure relates generally to performance prediction systems, and more particularly to systems and methods for predicting performance of applications on an internet of things (IoT) platform.

BACKGROUND

Internet of things (IoT) brings the next wave in the era of computing where many of objects that surround people are connected on a network in some form or the other. In this new paradigm of computing, an IoT platform plays an important role since it offers services that are essential for building IoT applications. There are multiple commercial IoT platforms and among them four big players are IBM Watson IoT platform, Amazon Web Services IoT platform, Cisco's IoT cloud connect, Microsoft Azure IoT platform, and a number of popular open source IoT platforms such as Kaa—unobscured cloud platform for IoT, DeviceHive, the Physical Web powered by Google and so on. Many of these IoT platforms when hosted on clouds enable us to monitor, manage and control remote smart devices seamlessly as though they are connected to local server itself. IoT applications along with IoT platforms have a huge potential in redefining the way people live and work. However, many practical issues need to be addressed before they actually affect important aspects of our life. Performance Assurance is one such important requirement for wide acceptance of these applications.

Traditional performance modeling has focused on request response applications dealing with fixed size data sets. The new breed of IoT applications have additional elements such as smart devices along with sensors that lead to growing and dynamic data sets. While applying conventional performance modeling and analysis techniques in IoT applications, one has to ensure that the model prediction is able to address larger volume of data sets. A typical three tier web application consists of web-tier, business tier and database tier. However, in an IoT system, along with the three standard tiers, the smart things also constitute another important tier. Another important feature of IoT systems is the presence of a large number of technologies operating together—for example, a single device gateway tier in IoT application may use multiple software components such as high performance load balancer, key-value based NoSQL database for managing events and logs and Elasticsearch for fast storage and retrieval of information and so on. This adds to the complexity in building performance models for IoT application.

There are a number of IoT platforms that have come up in the recent past. In addition to the ones mentioned above. For example, Xively provides essential remote services for data pulled from any public feed. Thingspeak is an open source IoT platform that provides APIs to store and retrieve data from various devices. But none of these platforms report any performance analysis data. Depending on the area of IoT applications such as transportation, healthcare, industrial automation and emergency response, the issue of performance, reliability and availability can play a very important role, and performance of an IoT system depends on performance of individual components as well as technologies underneath which still remain unresolved.

SUMMARY

Embodiments of the present disclosure present technological improvements as solutions to one or more of the above-mentioned technical problems recognized by the inventors in conventional systems. For example, in one aspect, a method for predicting performance of one or more applications being executed on an Internet of Things (IoT) platform is provided. The method comprises obtaining, by the IoT platform, at least one of (i) one or more user requests and (ii) one or more sensor observations from one or more sensors; identifying and invoking one or more Application Programming Interface (APIs) of the IoT platform based on the at least one of (i) one or more user requests and (ii) one or more sensor observations from the one or more sensors; identifying, based on the one or more invoked APIs, one or more open flow requests and one or more closed flow requests of one or more systems connected to the IoT platform; identifying one or more workload characteristics of the one or more open flow requests and the one or more closed flow requests to obtain one or more segregated open flow requests and one or more segregated closed flow requests, and a combination of open and closed flow requests; executing one or more performance tests with the one or more invoked APIs based on the one or more workload characteristics; concurrently measuring utilization of one or more resources of the one or more systems and computing one or more service demands of each of the one or more resources, wherein the one or more service demands are computed from the measured utilization of the one or more resources, and number of user requests processed by the IoT platform per unit time; executing the one or more performance tests with the one or more invoked APIs based on a volume of workload characteristics pertaining to the one or more applications; and predicting, using a queuing network, performance of the one or more applications for the volume of workload characteristics.

In an embodiment, the step of executing the one or more performance tests with the one or more invoked APIs comprises: varying one or more input parameters of the one or more invoked APIs; and determining variation in the one or more service demands based on the one or more varied input parameters. In an embodiment, the variation in the one or more service demands is indicative of the performance of the one or more applications for the volume of workload characteristics. In an embodiment, the variation in the one or more service demands is determined based on at least one of (i) number of sensor observations and (ii) number of user requests obtained by the IoT platform.

The method may further comprise generating a log comprises details pertaining to the one or more sensor observations being obtained by the IoT platform from the one or more sensors, wherein the details comprises time-stamp values of arrivals of each of the one or more sensor observations; obtaining, based on the time-stamp values, one or more samples for inter-arrival time of sensor observations over a pre-defined duration; segregating the one or more samples into one or more time intervals; and deriving a plurality of inter-arrival distributions of the one or more sensor observations upon the one or more samples being segregated into the one or more time intervals.

In another aspect, a system is provided. The system comprising: one or more storage devices (memory) storing instructions; one or more communication interfaces; and one or more hardware processors coupled to the memory using the one or more communication interfaces, wherein the one or more hardware processors are configured by the instructions to execute an IoT platform that: obtains at least one of (i) one or more user requests and (ii) one or more sensor observations from one or more sensors. In an embodiment, the one or more hardware processors are further configured to: identify and invoke one or more Application Programming Interface (APIs) of the IoT platform based on the at least one of (i) one or more user requests and (ii) one or more sensor observations from the one or more sensors, identify, based on the one or more invoked APIs, one or more open flow requests and one or more closed flow requests of one or more systems connected to the IoT platform, identify one or more workload characteristics of the one or more open flow requests and the one or more closed flow requests to obtain one or more segregated open flow requests and one or more segregated closed flow requests, and a combination of open and closed flow requests, execute one or more performance tests with the one or more invoked APIs based on the one or more workload characteristics, concurrently measure utilization of one or more resources of the one or more systems and computing one or more service demands of each of the one or more resources, wherein the one or more service demands are computed from the measured utilization of the one or more resources, and number of user requests processed by the IoT platform per unit time. The one or more hardware processors are further configured by the instructions to execute the one or more performance tests with the one or more invoked APIs based on a volume of workload characteristics pertaining to one or more applications being executed on the IoT platform, and predict, using a queuing network, performance of the one or more applications for the volume of workload characteristics.

In an embodiment, one or more performance tests are executed with the one or more invoked APIs by: varying one or more input parameters of the one or more invoked APIs; and determining variation in the one or more service demands based on the one or more varied input parameters.

In an embodiment, the variation in the one or more service demands is indicative of the performance of the one or more applications for the volume of workload characteristics. In an embodiment, the variation in the one or more service demands is determined based on at least one of (i) number of sensor observations and (ii) number of user requests obtained by the IoT platform.

In an embodiment, the one or more hardware processors are further configured by the instructions to: generate a log file comprises details pertaining to the one or more sensor observations being obtained by the IoT platform from the one or more sensors, wherein the details comprises time-stamp values of arrivals of each of the one or more sensor observations, obtain, based on the time-stamp values, one or more samples for inter-arrival time of sensor observations over a pre-defined duration, segregate the one or more samples into one or more time intervals, and derive one or more inter-arrival distributions of the one or more sensor observations upon the one or more samples being segregated into the one or more time intervals.

In yet another aspect, one or more non-transitory machine readable information storage mediums comprising one or more instructions is provided. The one or more instructions which when executed by one or more hardware processors causes obtaining, by the IoT platform, at least one of (i) one or more user requests and (ii) one or more sensor observations from one or more sensors; identifying and invoking one or more Application Programming Interface (APIs) of the IoT platform based on the at least one of (i) one or more user requests and (ii) one or more sensor observations from the one or more sensors; identifying, based on the one or more invoked APIs, one or more open flow requests and one or more closed flow requests of one or more systems connected to the IoT platform; identifying one or more workload characteristics of the one or more open flow requests and the one or more closed flow requests to obtain one or more segregated open flow requests and one or more segregated closed flow requests, and a combination of open and closed flow requests; executing one or more performance tests with the one or more invoked APIs based on the one or more workload characteristics; concurrently measuring utilization of one or more resources of the one or more systems and computing one or more service demands of each of the one or more resources, wherein the one or more service demands are computed from the measured utilization of the one or more resources, and number of user requests processed by the IoT platform per unit time; executing the one or more performance tests with the one or more invoked APIs based on a volume of workload characteristics pertaining to the one or more applications; and predicting, using a queuing network, performance of the one or more applications for the volume of workload characteristics.

In an embodiment, the step of executing the one or more performance tests with the one or more invoked APIs comprises: varying one or more input parameters of the one or more invoked APIs; and determining variation in the one or more service demands based on the one or more varied input parameters. In an embodiment, the variation in the one or more service demands is indicative of the performance of the one or more applications for the volume of workload characteristics. In an embodiment, the variation in the one or more service demands is determined based on at least one of (i) number of sensor observations and (ii) number of user requests obtained by the IoT platform.

The instructions which when executed by the one or more hardware processors may further cause generating a log comprises details pertaining to the one or more sensor observations being obtained by the IoT platform from the one or more sensors, wherein the details comprises time-stamp values of arrivals of each of the one or more sensor observations; obtaining, based on the time-stamp values, one or more samples for inter-arrival time of sensor observations over a pre-defined duration; segregating the one or more samples into one or more time intervals; and deriving a plurality of inter-arrival distributions of the one or more sensor observations upon the one or more samples being segregated into the one or more time intervals.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
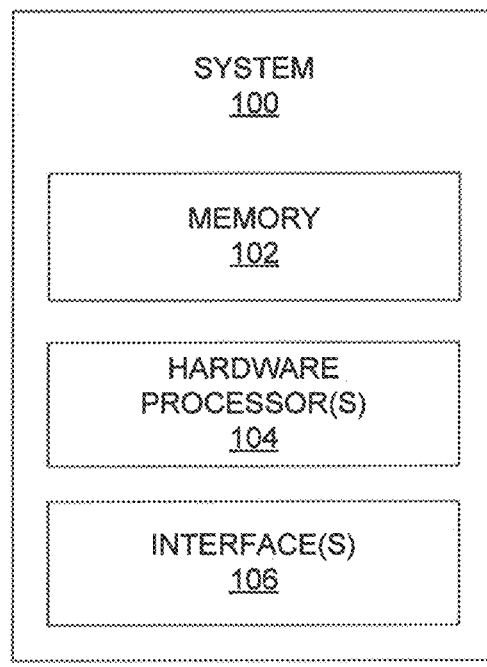
FIG. 1 illustrates an exemplary block diagram of a system for predicting performance of one or more applications executed on an internet of things (IoT) platform in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In IT organization, there is a requirement to ensure that applications developed on their own IoT platform can handle a large number of users without affecting the response time. The applications have multiple online transactions that analyze the input data from a number of sources. The application user base is likely to grow by a large extent in the near future. Further, the volume of input data being injected into the application backend is also likely to grow significantly. Thus, an IT organization or an entity needs to ensure that the infrastructure for the application can handle future usages as well. An IoT platform is typically hosted on a cloud environment where each component of the platform is using one or more virtual machine (VMs). In order to meet certain performance service level agreements (SLA) of the IoT application, the following important questions need to be addressed. For example, which component of an IoT platform becomes a bottleneck when the platform is handling the peak data rate from a certain number of sensors? Whether there would be a violation of response time SLA for a certain growth in the number of users accessing the IoT services? How many VMs are required for a specific component of an IoT platform in order to ensure SLA for a certain number of users? Whether the platform can support multiple APIs simultaneously without affecting the performance?; and how does the platform perform in case of big data store as opposed to standard RDBMS layer as the backend?

Further, for the specific sample IoT application one deals with, they conduct only a limited number of performance tests due to limited access to deployment platform. It is noticed that two fundamental questions that every IoT platform provider would like to address are: (1) whether the platform is ready for connecting to a certain number of devices, and (2) whether the platform can handle growing number of users requests. Using simple Queuing Network modeling approach based on a few performance tests, the embodiments of the present disclosure provide systems and methods that have attempted to address both of these concerns as well as addressed to the above mentioned issues. Though there have been diversified areas of research in IoT, very few work deal with performance modeling of IoT applications. The embodiments of the present disclosure provides systems and methods to identify important hurdles in modeling practical IoT applications using standard modeling techniques and propose their solutions.

Referring now to the drawings, and more particularly to FIG. 1 through 12, where similar reference characters denote corresponding features consistently throughout the figures, there are shown preferred embodiments and these embodiments are described in the context of the following exemplary system and/or method.

FIG. 1 illustrates an exemplary block diagram of a system 100 for predicting performance of one or more applications executed on an internet of things (IoT) platform in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
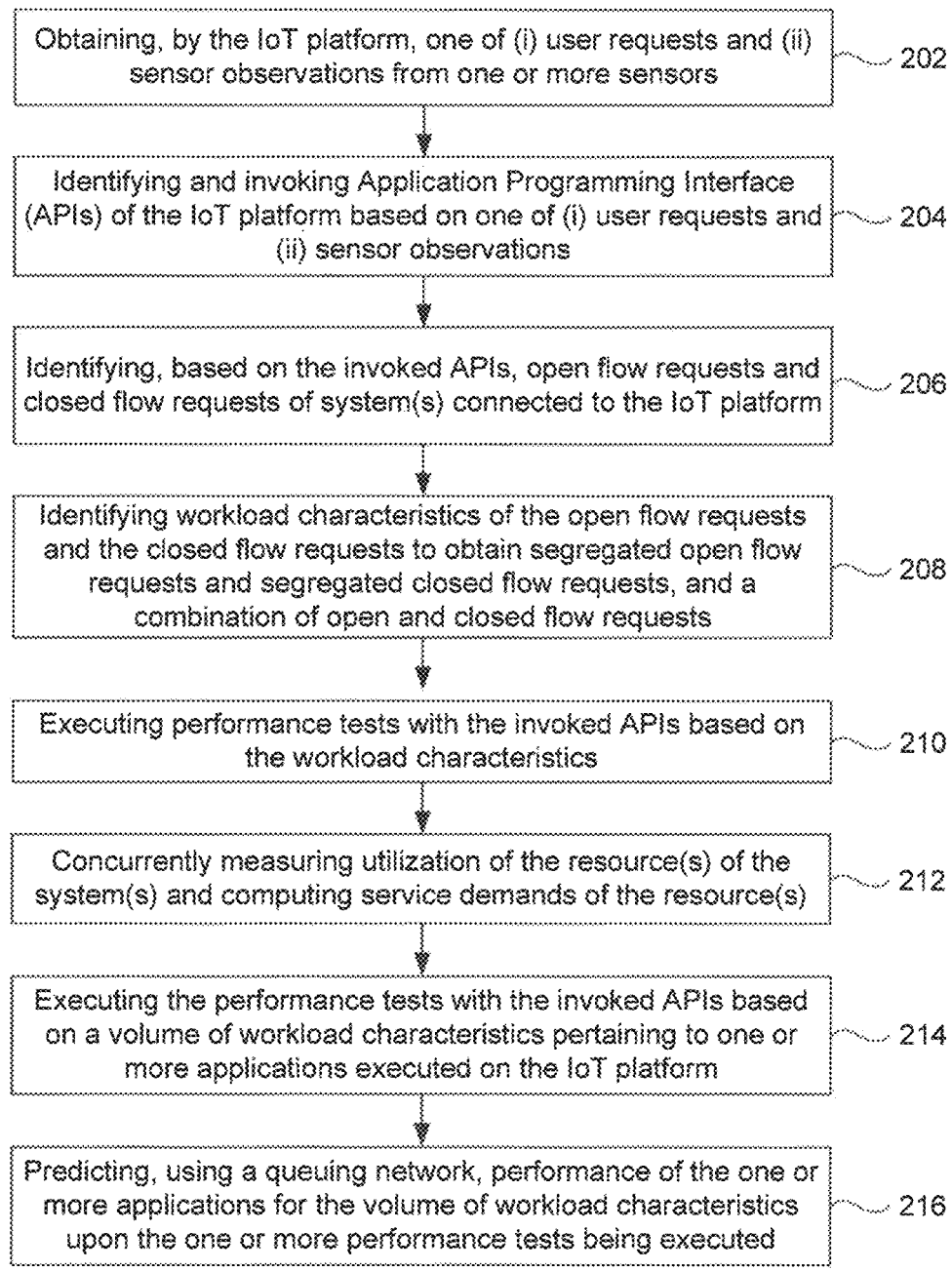
FIG. 2 illustrates an exemplary flow diagram of a method for predicting performance of one or more applications executed on the IoT platform in accordance with an embodiment of the present disclosure.

FIG. 2, with reference to FIG. 1, illustrates an exemplary flow diagram of a method for predicting performance of one or more applications executed on the IoT platform in accordance with an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment of the present disclosure, at step 202, the one or more processors 104 (or the IoT platform) obtain at least one of (i) one or more user requests and (ii) one or more sensor observations from one or more sensors. In an embodiment of the present disclosure, the system 100 may receive input comprising the one or more user requests only, or the one or more sensor observations only, or combination of both user request(s) and sensor observation(s). In an embodiment of the present disclosure, at step 204, the one or more processors 104 identify and invoke one or more Application Programming Interface (APIs) of the IoT platform based on the input comprising at least one of (i) one or more user requests and (ii) one or more sensor observations from the one or more sensors.

In an embodiment of the present disclosure, at step 206, the one or more processors identify, based on the one or more invoked APIs, one or more open flow requests and one or more closed flow requests of one or more systems connected to the IoT platform. In an embodiment of the present disclosure, open flow requests (also referred herein as "Open Queuing Network) refers to where external arrivals and departures take place. In an embodiment of the present disclosure, closed flow requests (also referred herein as "Closed Queuing Network") refers to where no external arrival and departure takes place and same number of requests loop through the set of queues. In an embodiment of the present disclosure, at step 208, the one or more processors 204 identify one or more workload characteristics of the one or more open flow requests and the one or more closed flow requests to obtain one or more segregated open flow requests and one or more segregated closed flow requests, and a combination of open and closed flow requests. In an embodiment of the present disclosure, at step 210, the one or more processors 204 execute one or more performance tests with the one or more invoked APIs based on the one or more workload characteristics.

In an embodiment of the present disclosure, at step 212, the one or more processors 104 concurrently measure utilization of one or more resources of the one or more systems and compute one or more service demands of each of the one or more resources. In an embodiment of the present disclosure, the one or more service demands are computed from (i) the measured utilization of the one or more resources, and/or (ii) number of user requests processed by the IoT platform per unit time.

In an embodiment of the present disclosure, at step 214, the one or more processors 204 execute the one or more performance tests with the one or more invoked APIs based on a volume of workload characteristics pertaining to the one or more applications executed on the IoT platform. In an embodiment of the present disclosure, the one or more performance tests are executed with the one or more invoked APIs by varying one or more input parameters of the one or more invoked APIs, and variation in the one or more service demands is determined based on the one or more varied input parameters. In another embodiment of the present disclosure, the variation in the one or more service demands is determined based on at least one of (i) number of sensor observations and (ii) number of user requests obtained by the IoT platform. In an embodiment of the present disclosure, at the step 216, the one or more processors 204 predict, using a queuing network, performance of the one or more applications for the volume of workload characteristics. In an embodiment of the present disclosure, "Queuing Network" refers to a model in which one or more jobs from one queue arrive at another queue.

In an embodiment, the method when executed by the IoT platform, further comprises generating a log file comprises details pertaining to the one or more sensor observations being obtained by the IoT platform from the one or more sensors, wherein the details comprises time-stamp values of arrivals of each of the one or more sensor observations. The IoT platform is further configured to obtain, based on the time-stamp values, one or more samples for inter-arrival time of sensor observations over a pre-defined duration, segregate the one or more samples into one or more time intervals, and derive one or more inter-arrival distributions of the one or more sensor observations upon the one or more samples being segregated into the one or more time intervals.

Figure 3:
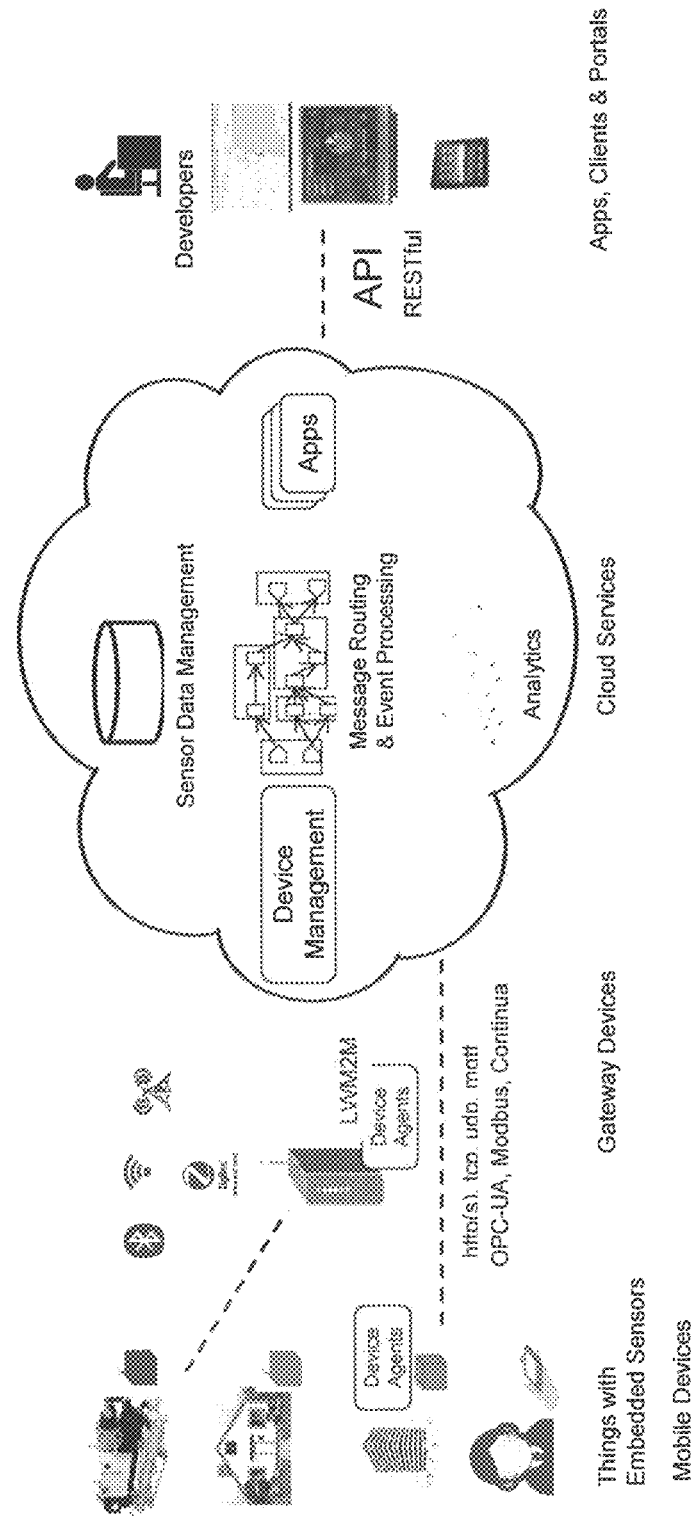
FIG. 3 is an exemplary overview of an IoT platform in according to an embodiment of the present disclosure.

FIG. 3, with reference to FIGS. 1-2, is an exemplary overview of an IoT platform in according to an embodiment of the present disclosure. As can be depicted from FIG. 3, the IoT platform provides support for (i) connecting to different devices (e.g., but are not limited to smart devices), (ii) managing application development and deployment, (iii) sensor data (or sensor observations) acquisition and management, etc. through a number of APIs. The APIs supported by the IoT platform address problems which are illustrated by way of examples:

1) Manage Interoperability: It provides standardized semantics, enable access and crowd sourced application development.
2) Manage Diversity: It enables different sensor types with varied functional capabilities supplied by different vendors to communicate with the IoT platform.
3) Manage Scale: It enables monitoring and managing a large number of devices and sensors remotely.

FIG. 3 illustrates one or more core components of the IoT platform proposed and implemented by the system 100 of the present disclosure. One or more physical systems for example, but not limited to, smart meters in homes, sensors deployed in railway tracks, energy meters in office building, etc. are shown that act as the source of information. These devices communicate through device agents to platform services running on a public/private cloud. Device agent manages integration of devices which communicate through specific protocol adaptors and application proxies. Following are illustrative services offered by the IoT platform of the present disclosure and these services should not be construed as limiting the scope of the embodiments herein:

1) Device Integration and Management services offering.
2) Protocol adaptors and application proxies.
3) Sensor Observation Services along with Messaging Routing Services.
4) Sensor Stream Processing and Visualization, Batch Analytics and Data Explorer Services.

FIG. 3 further shows that at one side of the IoT platform, smart devices access the IoT platform through a set of APIs (e.g., representational state transfer (REST) APIs). At the other end, the IoT platform can help in quick development and deployment of IoT applications. This is due to availability of a set of common services offered by the IoT platform that are essential for one or more IoT applications executed on the IoT platform.

Each of the services offered by the IoT platform can work independent of other services. However, in the present disclosure, the system 100 focuses on Sensor Observation Services (SOS) that are responsible for storing and managing sensor observations and a message routing service that acts as a rule processing engine which applies various rules on sensor observations and push these observations to different subscribers based on the rules they satisfy.

Figure 4:
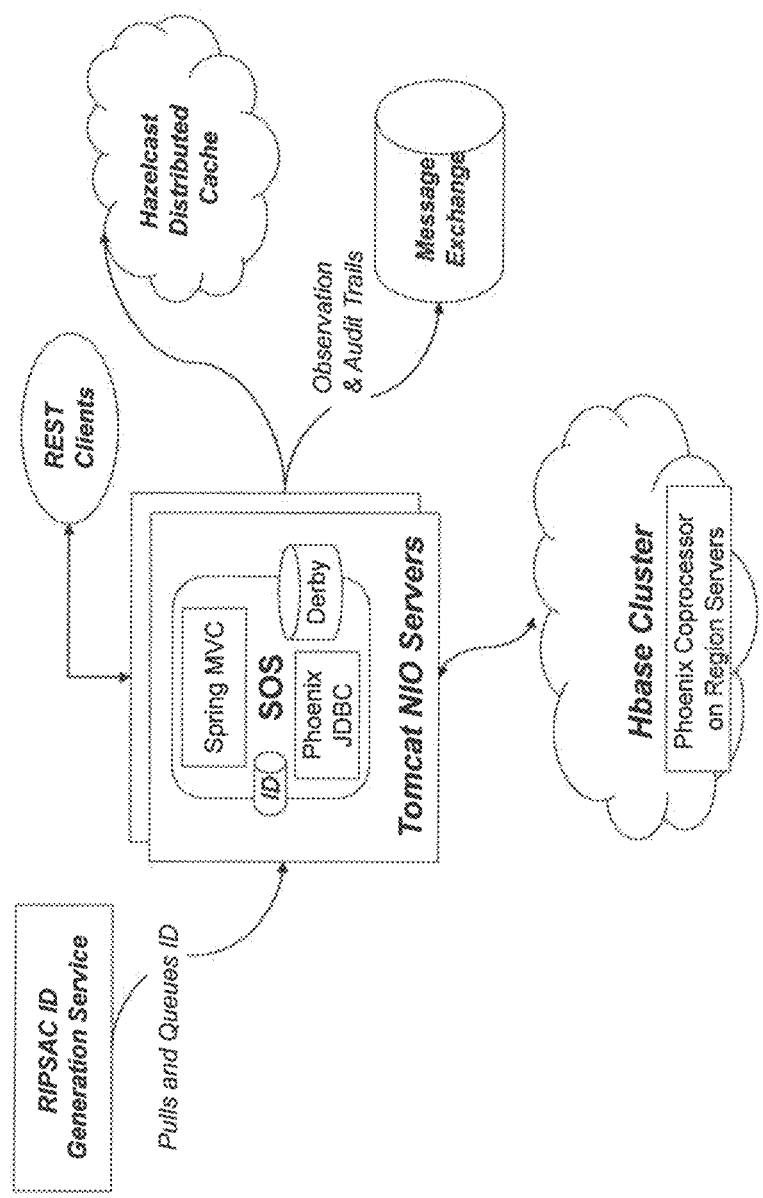
FIG. 4 illustrates an exemplary Sensor Observation Service (SOS) architecture according to an embodiment of the present disclosure.

FIG. 4, with reference to FIGS. 1-3, illustrates an exemplary Sensor Observation Service SOS architecture according to an embodiment of the present disclosure. As can be depicted in the SOS architecture, Tomcat NIO server processes actual logic corresponding to the observation APIs. It has a Derby in-memory database for handling user authentication. Sensor observations are inserted into a Hbase datastore (which can also be replaced by a relational database such as PostgreSQL).

The embodiments of the present disclosure analyze the performance of the IoT platform by predicting performances of one or more IoT applications executed on the IoT platform based on (i) number of sensors injecting observations to an IoT system which increases with time. This may result an increase in both data arrival rate and volume of arrivals, and (ii) number of (online) users requesting certain information from IoT system increases significantly over time.

The system 100 measures performance metrics for example, throughput (the number of transactions per second or minute) and response time. Response time is measured in terms of the delay between a request by a client for certain information regarding sensor observations to actually receiving the response from a back-end server. The other metric that is captured from a system administrator perspective is system resource utilization at important servers. All these metrics are compared as they are predicted by a simulator model and the actual values measured during either performance testing or obtained through log file analysis from the production environment.

Deployment Platform:

The embodiments of the present disclosure implemented separate environments for testing modules of the IoT platform. The first environment was built using dedicated servers on Eka cluster, wherein each of the servers were 8 cores, Intel Quadcore Xeon processor, and each of the SOS components such as Tomcat, Hazelcast, HBase Masternode, Zookeeper along with each of the Region Servers were deployed on individual server. In spite of having 8 cores servers for Tomcat, expected scalability of Sensor Observation Services module were not achieved since the servers belong to earlier generations and have mostly old configurations. However, this deployment offers better scalability as compared to 2 cores virtual machine (VM) instance on AWS due to larger number of cores. On Amazon, each of the VMs used had 2 cores and 4 GB RAM. In this deployment, PostgreSQL was used as the data store instead of HBase and is having separate VM than the Tomcat server such that utilization of application server and database server were separately traceable. In most of the situations, it was noticed that CPU at the Tomcat layer is the bottleneck. Hence, in the analysis, the embodiments of the present disclosure focused on CPU service demand.

Figure 5:
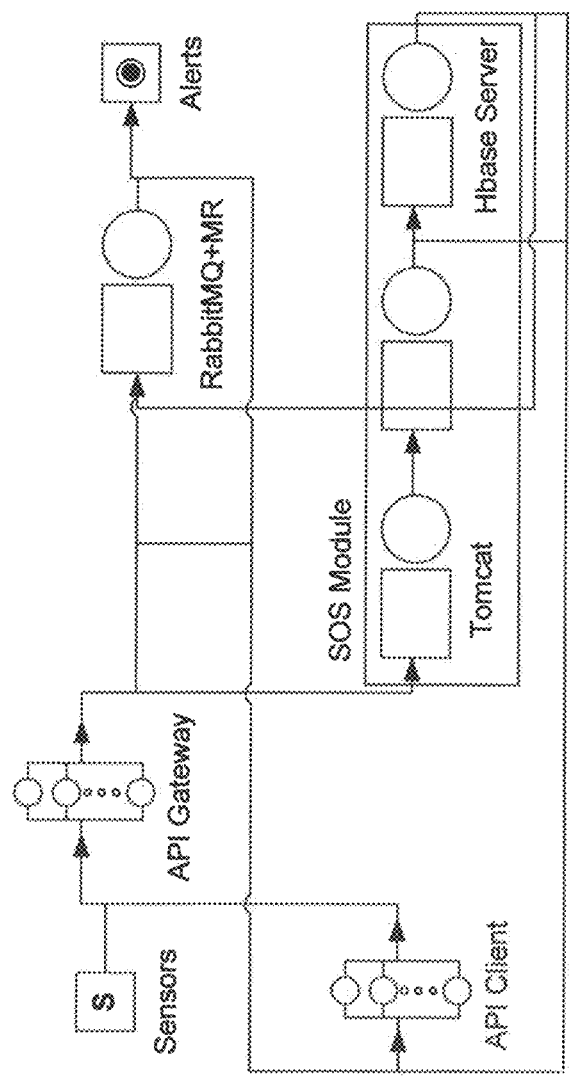
FIG. 5 illustrates an exemplary model for Sensor Observation Services (SOS) and Message Routing component according to an embodiment of the present disclosure.

In order to predict performance of the IoT platform, primarily in modeling the performance in terms of requests and/or responses, the embodiments of the present disclosure implemented Java Modeling Tools to model performance of the IoT platform and one or more applications executed on the IoT platform. FIG. 5, with reference to FIGS. 1-4, illustrates an exemplary model for Sensor Observation Services (SOS) and Message Routing component according to an embodiment of the present disclosure. More specifically, FIG. 5 illustrates Queuing Network Model for SOS according to an embodiment of the present disclosure. FIG. 5 depicts separate queue elements corresponding to Tomcat, Hazelcast, Hbase and Message Routing service. Message Routing service includes a RabbitMQ node. There are different types of workload for SOS module but the main two requests are PostObservation API and GetObservation API. Both of these requests are modeled as closed class with API client representing the think time between the requests. All API requests pass through API gateway that controls the flow of requests. Currently it is modeled as delay element to represent very short processing time at the gateway. Each PostObservation API request after it gets processed by Sensor Observation service components, such as Tomcat, Hazelcast and Hbase also goes to Message Routing node. The flow of requests from SOS to message routing node cannot be modeled as standard fork-join element since PostObservation API request from API client returns to the client after getting processed by SOS and does not wait for message routing to complete. In contrast, the requests from message routing module need to reach the subscriber which is the sink node. The model requires that every Open request flow must have a sink node. Thus, the workload for PostObservation API belongs to both Open and Closed type of requests which falls under a category of combination of open and closed flow requests.

In conventional methods and systems, it is noticed that workloads which are partially open and based on certain probability, the requests either follow open or closed loop. However, it is not seen that open requests that get forked after getting processed in a closed network. The embodiments of the present disclosure address the challenge of modeling PostObservation API as both open and closed class by introducing additional OpenPostObservation API request which has zero service demand at all SOS nodes but has positive service demand at message routing node. The arrival rate of OpenPostObservation API is matched with the throughput for PostObservation API which is a closed request.

For better understanding of the above description, an expression for Closed Queuing Network that consists of all the nodes in the lower part of FIG. 5 is illustrated. Representing think time of Post requests as $Z_{post}$ and response time as $R_{tomcat}$ for Tomcat node, $R_{Hazel}$ for Hazelcast node and $R_{Hbase}$ for Hbase node and overall throughput of the Closed system as $X_{post}$. If N is the number of threads requesting PostObservation API, then based on Little's Law, the relationship between throughput and response time can be expressed as illustrated by way of example below:

$$X_{post} = \frac{N}{Z_{post} + \sum_{i \in S} R_i} \quad (1)$$

where the set S includes Tomcat, Hazelcast, Hbase and other subsystems. Response time at a node is calculated based on its Queue length and service demand of PostObservation API at that node. Using the initial test results, the service demands are obtained, and through JMT tool, all these metrics for the closed queuing network are obtained. The throughput value obtained from the above network is used as the rate of arrival for requests belonging to OpenPostObservation API class in the Open Queuing network. The Open network consists of sensors, API gateway, RabbitMQ and alerts. Assuming that the Queuing network is of type M/G/1 since the arrival of API requests can be taken as Poisson process and service time is taken as general. It is observed that the utilization for nodes in Open Queuing network matches the prediction in JMT. Henceforth, it is assumed that the output of SOS module follows a Poisson distribution as it is fed to Open Queuing network comprising of message routing and RabbitMQ node.

where the set S includes Tomcat, Hazelcast, Hbase and other subsystems. Response time at a node is calculated based on its Queue length and service demand of PostObservation API at that node. Using the initial test results, the service demands are obtained, and through JMT tool, all these metrics for the closed queuing network are obtained. The throughput value obtained from the above network is used as the rate of arrival for requests belonging to Open-PostObservation API class in the Open Queuing network. The Open network consists of sensors, API gateway, RabbitMQ and alerts. Assuming that the Queuing network is of type M/G/1 since the arrival of API requests can be taken as Poisson process and service time is taken as general. It is observed that the utilization for nodes in Open Queuing network matches the prediction in JMT. Henceforth, it is assumed that the output of SOS module follows a Poisson distribution as it is fed to Open Queuing network comprising of message routing and RabbitMQ node.

The steps involved in building performance models for an IoT platform is described in FIG. 2 which involves identifying important APIs of the IoT platform and important system components visited by these requests. Then performance tests are conducted with single API and a few combinations of Mixed APIs with certain number of concurrent threads. While performing the tests, system utilization is measured and service demands are computed. These performance tests are repeated for volume of workload characteristics (e.g., for higher workloads) and by varying input parameters of the APIs to find out variations (if any) in service demands. These service demands are input to the performance prediction of the IoT applications, and the IoT platform thereof.

Performance of Single API

Figure 6A:
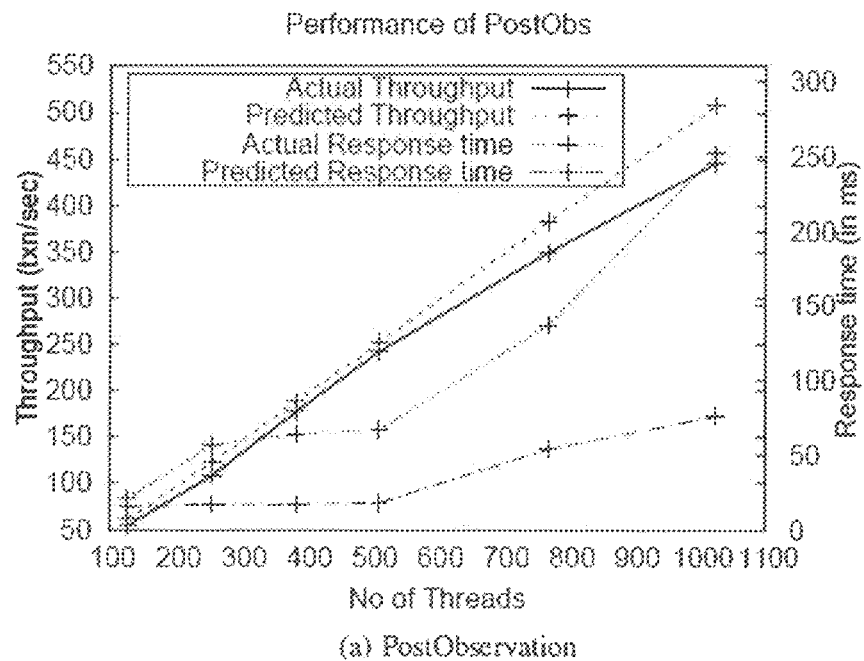
FIGS. 6A-6B are graphical representations illustrating performances of one or more Application Programming Interfaces (APIs) on Eka cluster according to an embodiment of the present disclosure.
Figure 6B:
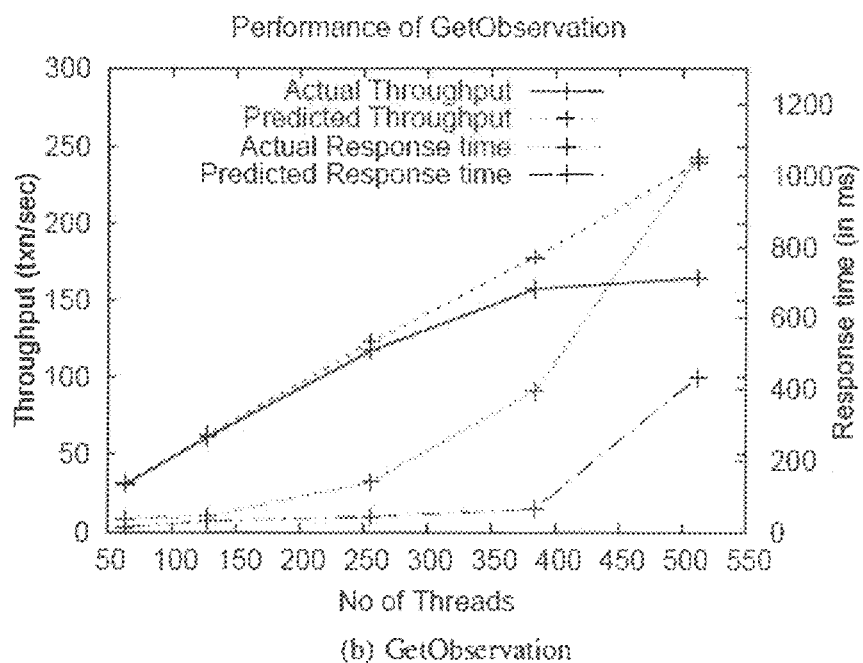

FIGS. 6A-6B, with reference to FIGS. 1 through 5, are graphical representations illustrating performances of one or more Application Programming Interfaces (APIs) on Eka cluster according to an embodiment of the present disclosure.

In order to analyze the scalability of the IoT platform, initial performance testing is done for individual APIs. The objective is to validate whether each of the APIs can support a large number of concurrent accesses. Two sets of REST APIs from SOS module are most commonly used: (1) GetObservation( ) API, and (2) PostObservation( ) API. Besides them, the other APIs deal with posting and editing of sensors metadata and getting the capabilities of SOS and so on. Whenever a sensor has a new observation to send to the IoT platform, PostObservation API is invoked. Since PostObseration API gets executed more frequently than GetObservation API, it is tested for higher concurrency. Load testing (e.g., regular load testing) for these APIs are performed. In FIG. 6A, it is observed that PostObservation( ) API has low response time till 1024 concurrent threads. Thus, this API is able to provide the desired scalability. Further, PostObservation API has fixed size request and response length. Hence, it is expected that CPU service demand of this API remains unaffected at higher concurrency. In the experiments performed during the implementation of the embodiments of the present disclosure, it is also seen that the Tomcat CPU service demand does not vary much with higher concurrency.

In case of GetObservation API, the response size depends on the number of observations satisfying a specific criteria given in the query. Thus it is expected that the service demand of the API to be dependent on the number of observations retrieved for the sensor. FIG. 6B shows the scalability of this API as observed and as predicted by the system 100. Currently performance testing is done with sensors having 50 observations. It is observed that the API does not scale beyond 512 threads. At 512 threads CPU utilization on Tomcat VM reaches close to 80% and the response time increases more than 1 second. With the query response size there is a linear increase in service demand for GetObservation API. Through additional measurements, it is noticed that the Tomcat CPU demand is 14 ms, 27.1 and 46 ms when the number of observations retrieved by the sensor is 1, 100 and 1000-2000. Thus, it is inferred that if this API is used for retrieving a large number of observations, then the Tomcat layer would require more than 1 VMs for concurrency larger than 512 threads.

Figure 7:
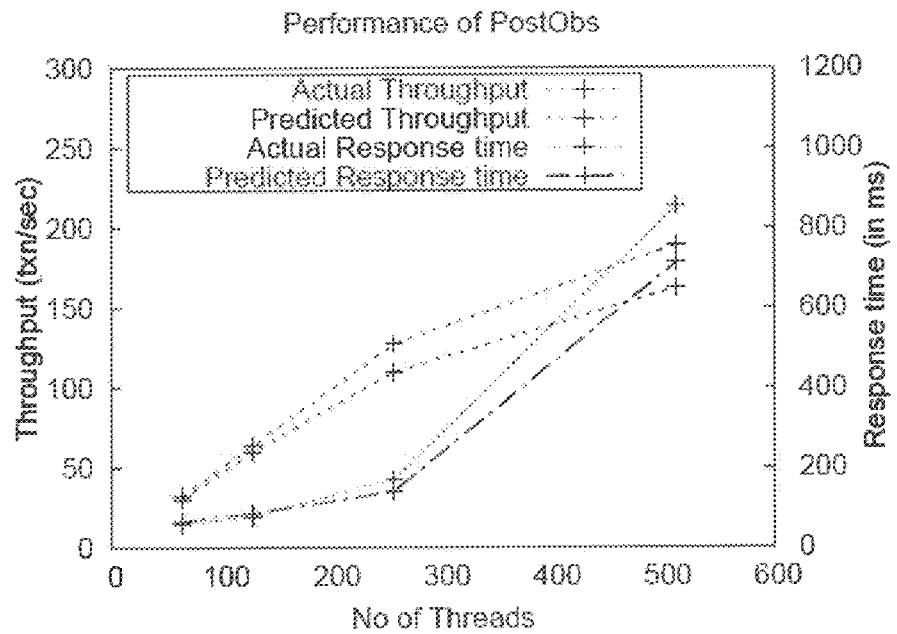
FIG. 7 is a graphical representation illustrating performance of an API on Amazon Web Services (AWS) server according to an embodiment of the present disclosure.
Figure 8:
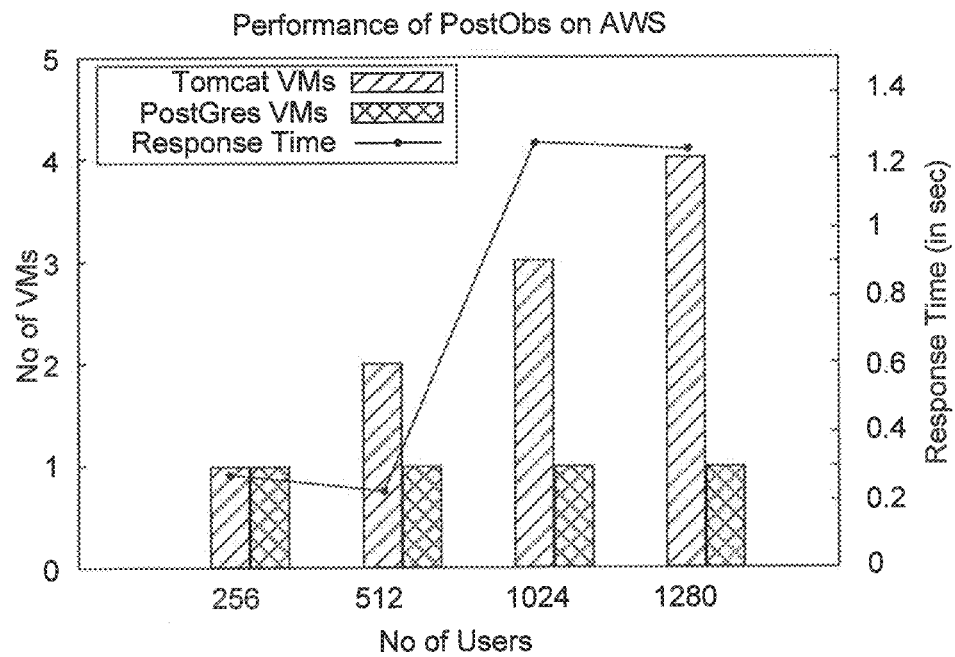
FIG. 8 is a graphical representation illustrating number of virtual machines required for an API according to an embodiment of the present disclosure.

FIG. 7, with reference to FIGS. 1 through 6, is a graphical representation illustrating performance of an API on Amazon Web Services (AWS) server according to an embodiment of the present disclosure. More specifically, FIG. 7 depicts the performance of PostObservation API on AWS server. On AWS deployment, instead of HBase as the database backend, PostGres is used for comparing the performance of these two scenarios. In AWS deployment environment, a VM has 2 CPU cores and on such a VM, PostObservation API scales up-to 256 threads if the response time SLA is 1 sec. As a result, it requires additional VMs to scale to 512. The goal of the present disclosure is to verify whether PostObservation API can scale to higher number of threads by using additional VMs. FIG. 8, with reference to FIGS. 1 through 7, is a graphical representation illustrating number of virtual machines required for an API according to an embodiment of the present disclosure. More specifically, FIG. 8 depicts the horizontal scalability of PostObservation( ) API according to an example embodiment of the present disclosure. Particularly, FIG. 8 depicts that the number of Tomcat VMs required for scaling to 512 threads, 1024 threads and 1280 threads are 2, 3 and 4 respectively. In all these cases, only one PostGres VM (data layer) is able to handle all the requests. However at 1280 threads, PostGres VM saturates and a higher VM is needed for scaling beyond 1280 threads. Thus, the model is able to predict the number of VMs required for scaling to higher number of users.

Performance of Mixed APIs

Figure 9:
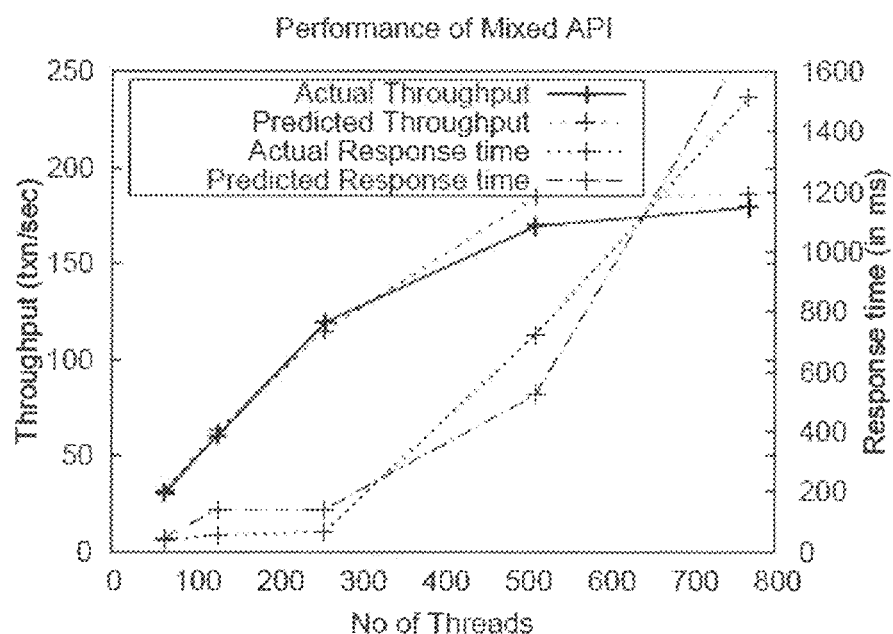
FIG. 9 is a graphical representation illustrating results of performance testing and the corresponding prediction by the system of FIG. 1 according to an embodiment of the present disclosure.

The embodiments of the present disclosure enables the system 100 to perform tests with different mixture of APIs. The goal here is to validate when multiple APIs are being accessed separately, performance of one API not getting affected by other API. One such mix has 80% threads accessing PostObservation API and 10% threads accessing GetObservation latest API. The latter API gets served from Hazelcast cache instead of HBase and gives only the latest observation for a sensor. FIG. 9, with reference to FIGS. 1 through 8, is a graphical representation illustrating results of performance testing and the corresponding prediction by the system 100 according to an embodiment of the present disclosure. Performance of mixed API reflects the performance of API which is dominant in the workload mix. In this case, PostObservation API constitutes 80% of the threads and it is observed that the workload does not scale beyond 1024 threads and there is an increase in response time beyond 768 threads. Note that similar behavior is observed in case of PostObservation API as well. However, during the testing it is noticed that any specific performance effect of one API due to other. API except that performance of mixed API depends on the scalability of individual component APIs as well as on the ratio of their mixing.

Performance Analysis of a Sample IoT Application

In this section, performance of a sample application running on the IoT platform is analysed. The context used for the application is an energy monitoring system of a number of office buildings spread across multiple geographical locations. Sources of energy can be HVAC, lighting, UPS and so on. The IoT platform is (primarily) used for storing sensor observations in order to run analytic queries over them. However, for doing more online interactive queries, the sensor observation data is also stored using Elasticsearch. Sensor data comes through a device gateway to IoT platform. This data gets inserted in the data store corresponding to the IoT platform, further it gets pushed to the Energy Monitoring backend through a Publish Subscribe system using RabbitMQ.

Brief Description of the Backend

Figure 10:
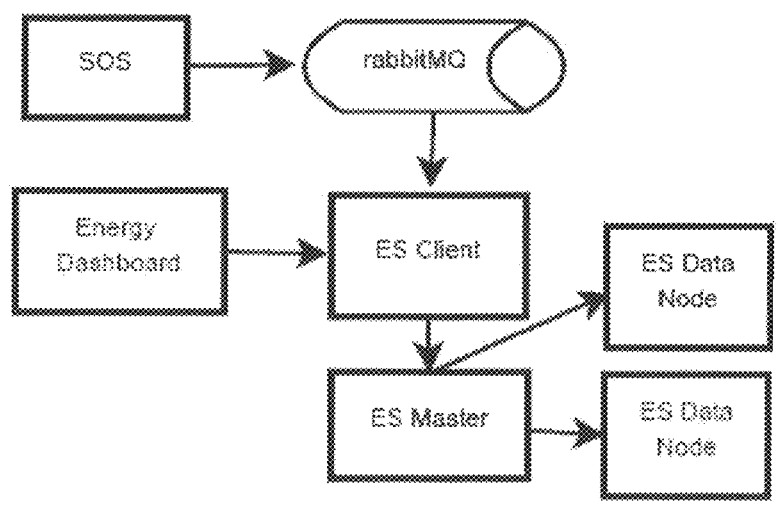
FIG. 10 illustrates an exemplary architectural view of an additional backend layer used for monitoring energy usage according to an embodiment of the present disclosure.

The energy monitoring system uses additional computing and storage system apart from the IoT platform described earlier. FIG. 10, with reference to FIGS. 1 through 9, illustrates an exemplary architectural view of an additional backend layer used for monitoring energy usage according to an embodiment of the present disclosure. The users can send different online queries to view various statistics on the energy usage. These queries are directed to Elasticsearch server. The server also receives data from sensors through a node which subscribes to messages published by RabbitMQ. Thus Elasticsearch system stores sensor information and the clients retrieve specific information based on the queries fired. Apart from online queries there are alert generating services that get executed at the Elasticsearch database. Thus the following types of requests flow to Elasticsearch (ES) backend as follows:

1) Queries received from online users.
2) Sensor Data insertion from the IoT platform to ES backend.
3) Queries received at regular intervals for generating alerts.

Deriving Request Inter-Arrival Distribution

As a first step towards characterizing the performance of the application, data in-flow rate is derived. Specifically, the inter-arrival distribution of sensor observations is derived. Some of the sensors in the Energy Monitoring application are configured to send data every fifteen minutes whereas some other sensors send data in every hour. Moreover, there are pre-configured pulling routines which query sensors and pull their observations based on some update or event.

Hence, data arrival rate from sensors to IoT platform is not fixed. This is confirmed from the log file. Every time an observation gets inserted to IoT platform, the application server layer makes an entry in its log file. Thus time-stamp values of arrival of sensor observation for each sensor observation is obtained. From this, one or more samples are obtained for the inter-arrival time of observations arriving over a predefined duration (e.g., over duration of fifteen minutes). Then, the inter-arrival time samples are segregated into various time intervals. In other words, the inter-arrival time samples are bucketed in buckets corresponding to 10 ms, 20 ms, 30 ms etc. This is repeated for various times of the day and for all these intervals of fifteen minutes duration, distribution for the inter-arrival time is obtained. Then the first and second moments for the distribution are obtained and compared with various standard distributions. Statistical package are used by the system 100 to obtain the parameters for the inter-arrival distribution of sensor observations.

Figure 11:
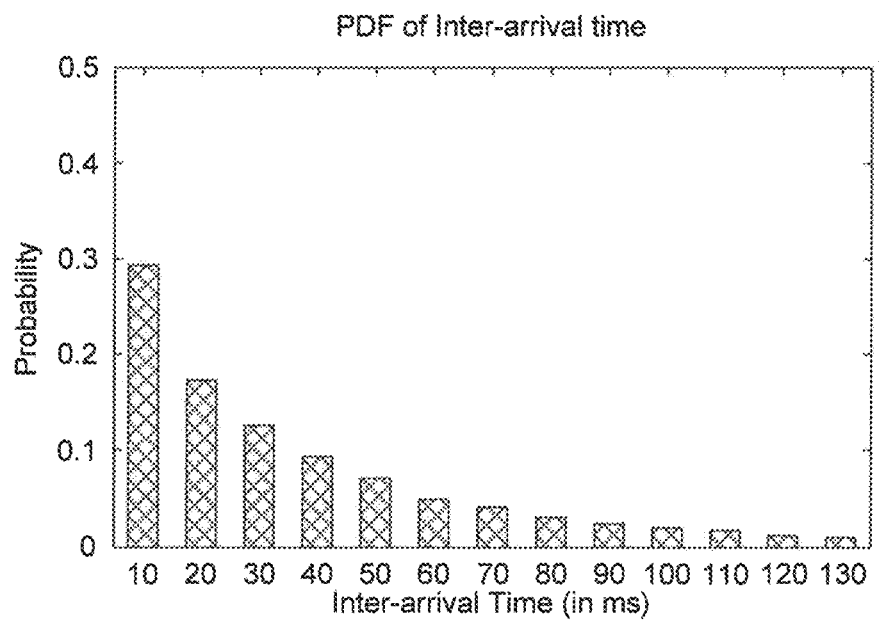
FIG. 11 is a graphical representation illustrating sample distribution of inter-arrival of sensor observations in an Energy Monitoring application being executed on an IoT platform according to an example embodiment of the present disclosure.

FIG. 11, with reference to FIGS. 1 through 10, is a graphical representation illustrating sample distribution of inter-arrival of sensor observations in an Energy Monitoring application being executed on an IoT platform according to an example embodiment of the present disclosure. This is modeled as hyper-exponential distribution since the mean of sensor data inter-arrival time is less than the standard deviation for the same. The embodiments of the present disclosure enables the system 100 to model it as a combination of three exponential distributions having different arrival rates reflecting data arrival rates of different types of sensors.

Deriving Service Demand for Transactions

Next challenge in predicting performance for the sample IoT application is accessing the production environment. The deployed platform is unavailable for extensive performance tests. Hence, service demands corresponding to many of the transactions are derived based on the available information in the log file. In the above sections, three different types of transactions were mentioned that are getting executed in the application. In off hours, only sensor data insertion and alert generating queries are available. Since, alert generating queries run at periodic intervals and cause higher system utilization during that period, the throughput of these alert generating queries are obtained and correlated with the utilization for specific duration (e.g., by applying the basic utilization law discussed in Quantitative System Performance: Computer System Analysis Using Queuing Network Models). Then, by using Least Square technique, the service demand of the above two transactions are derived. Two system resources that are primarily focused on by the embodiments of the present disclosure are CPU and disk for all the important servers.

For the third type of transactions, limited performance tests are conducted. For this, online queries are received from energy monitoring dashboard with large think-time (about 30 seconds) so as not to disturb the performance of the production environment. The utilization values during the performance tests are adjusted by off-setting suitably based on the CPU utilization corresponding to the earlier two cases. All these estimations are done taking a pessimistic approach such that whenever utilization is found to be varying over a short interval, the higher values of utilization may be taken/considered. Having obtained service demands for all different transactions, performance of the sample IoT application is extrapolated.

Extrapolation of Performance for Larger Users

Having estimated approximate service demand for three different types of transactions, the performance of the sample application is projected for the following:
1) The number of sensors sending the observations increases by a factor of 10-15.
2) The current user-base for the online application increases by a factor of 2-3.

For both of these cases, the performance of energy monitoring application is projected. Since currently there is no data available for larger number of sensors, and it is not allowed to send synthetic energy data that gets into the production database, it is not possible to validate the prediction for the first case. But in the queuing model, the average rate of arrival for sensor observations is increased by a factor of 10 and the system 100 predicts that the current deployment can support occasional very high rate of observation arrivals without affecting the performance. For example, even if the observation arrival rate reaches 9000 observations/sec in 10% of the total duration, the time taken for data insertion to the backend is less than a second.

Figure 12:
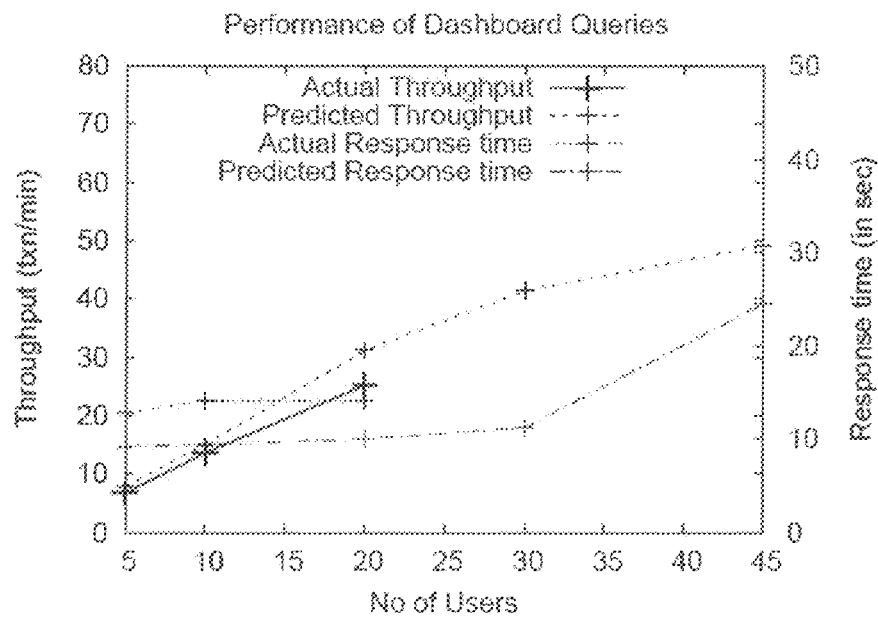
FIG. 12 is a graphical representation illustrating prediction of Dashboard Queries for higher number of users according to an embodiment of the present disclosure.

For the growth of online users injecting dashboard queries, a limited number of performance tests were executed (or performed) by injecting online queries at off-hours to the system 100. FIG. 12, with reference to FIGS. 1 through 11, is a graphical representation illustrating prediction of Dashboard Queries for higher number of users according to an embodiment of the present disclosure. More specifically, FIG. 12 illustrates the predicted performance for up-to 45 concurrent users whereas the system 100 is able to obtain actual test results for only 5-20 concurrent users. It can be verified that the system prediction is within 8-10% of the actual system performance. Since the system response time is found to be more than 10 sec, it can be worked towards tuning the performance of the application.

The embodiments of the present disclosure have dealt with performance analysis specifically scalability analysis of an IoT platform and applications (e.g., (IoT) applications) that provides services in terms of a set of APIs hosted on a cloud platform. Using analytical modeling technique, the system 100 predicts the performance of these APIs—for individual APIs as well as for mixed APIs and validate their performance through performance testing results. The platform is capable of supporting a large number of concurrent threads as can be seen from the graphical representations depicted in the FIGS. The system 100 reports measurement results for two deployment scenarios for the IoT platform—one consists of a set of physical servers and another is on AWS. Further, the embodiments of the present disclosure also enables the system 100 to analyze performance of a sample IoT application using services of the IoT platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for predicting performance of one or more applications being executed on an Internet of Things (IoT) platform, comprising:
   obtaining, by said IoT platform, at least one of (i) one or more user requests and (ii) one or more sensor observations from one or more sensors;
   identifying and invoking one or more Application Programming Interface (APIs) of said IoT platform based on said at least one of (i) one or more user requests and (ii) one or more sensor observations from said one or more sensors;
   identifying, based on said one or more invoked APIs, one or more open flow requests and one or more closed flow requests of one or more systems connected to said IoT platform;
   identifying one or more workload characteristics of said one or more open flow requests and said one or more closed flow requests to obtain one or more segregated open flow requests and one or more segregated closed flow requests, and a combination of open and closed flow requests;
   executing one or more performance tests with said one or more invoked APIs based on said one or more workload characteristics;
   concurrently measuring utilization of one or more resources of said one or more systems and computing one or more service demands of each of said one or more resources;
   executing said one or more performance tests with said one or more invoked APIs based on a volume of workload characteristics pertaining to said one or more applications; and
   predicting, using a queuing network, performance of said one or more applications for said volume of workload characteristics.

2. The method of claim 1, wherein the step of executing said one or more performance tests with said one or more invoked APIs comprises:
   varying one or more input parameters of said one or more invoked APIs; and
   determining variation in said one or more service demands based on said one or more varied input parameters.

3. The method of claim 2, wherein said variation in said one or more service demands is indicative of said performance of said one or more applications for said volume of workload characteristics.

4. The method of claim 2, wherein said variation in said one or more service demands is determined based on at least one of (i) number of sensor observations and (ii) number of user requests obtained by said IoT platform.

5. The method of claim 1, wherein said one or more service demands are computed from said measured utilization of said one or more resources, and number of user requests processed by said IoT platform per unit time.

6. The method of claim 1, further comprising:
   generating a log comprises details pertaining to said one or more sensor observations being obtained by said IoT platform from said one or more sensors, wherein said details comprises time-stamp values of arrivals of each of said one or more sensor observations;
   obtaining, based on said time-stamp values, one or more samples for inter-arrival time of sensor observations over a pre-defined duration;
   segregating said one or more samples into one or more time intervals; and
   deriving one or more inter-arrival distributions of said one or more sensor observations upon said one or more samples being segregated into said one or more time intervals.

7. A system comprising:
   a memory storing instructions;
   one or more communication interfaces; and
   one or more hardware processors coupled to said memory using said one or more communication interfaces, wherein said one or more hardware processors are configured by said instructions to execute an IoT platform that:
      obtains at least one of (i) one or more user requests and (ii) one or more sensor observations from one or more sensors, wherein said one or more hardware processors are further configured to:
      identify and invoke one or more Application Programming Interface (APIs) of said IoT platform based on said at least one of (i) one or more user requests and (ii) one or more sensor observations from said one or more sensors,
      identify, based on said one or more invoked APIs, one or more open flow requests and one or more closed flow requests of one or more systems connected to said IoT platform,
      identify one or more workload characteristics of said one or more open flow requests and said one or more closed flow requests to obtain one or more segregated open flow requests and one or more segregated closed flow requests, and a combination of open and closed flow requests,
      execute one or more performance tests with said one or more invoked APIs based on said one or more workload characteristics,
      concurrently measure utilization of one or more resources of said one or more systems and computing one or more service demands of each of said one or more resources,
      execute said one or more performance tests with said one or more invoked APIs based on a volume of workload characteristics pertaining to one or more applications being executed on said IoT platform, and
      predict, using a queuing network, performance of said one or more applications for said volume of workload characteristics.

8. The system of claim 7, wherein said one or more performance tests are executed with said one or more invoked APIs by:
   varying one or more input parameters of said one or more invoked APIs; and
   determining variation in said one or more service demands based on said one or more varied input parameters.

9. The system of claim 8, wherein said variation in said one or more service demands is indicative of said performance of said one or more applications for said volume of workload characteristics.

10. The system of claim 8, wherein said variation in said one or more service demands is determined based on at least one of (i) number of sensor observations and (ii) number of user requests obtained by said IoT platform.

11. The system of claim 7, wherein said one or more service demands are computed from said measured utilization of said one or more resources, and number of user requests processed by said IoT platform per unit time.

12. The system of claim 7, wherein said one or more hardware processors are further configured by said instructions to:
generate a log file comprises details pertaining to said one or more sensor observations being obtained by said IoT platform from said one or more sensors, wherein said details comprises time-stamp values of arrivals of each of said one or more sensor observations,
obtain, based on said time-stamp values, one or more samples for inter-arrival time of sensor observations over a pre-defined duration,
segregate said one or more samples into one or more time intervals, and
derive one or more inter-arrival distributions of said one or more sensor observations upon said one or more samples being segregated into said one or more time intervals.

13. One or more non-transitory machine readable information storage mediums comprising one or more instructions which when executed by one or more hardware processors perform a method of predicting performance of one more applications being executed on an Internet of Things (IoT) platform by:
obtaining, by said IoT platform, at least one of (i) one or more user requests and (ii) one or more sensor observations from one or more sensors;
identifying and invoking one or more Application Programming Interface (APIs) of said IoT platform based on said at least one of (i) one or more user requests and (ii) one or more sensor observations from said one or more sensors;
identifying, based on said one or more invoked APIs, one or more open flow requests and one or more closed flow requests of one or more systems connected to said IoT platform;
identifying one or more workload characteristics of said one or more open flow requests and said one or more closed flow requests to obtain one or more segregated open flow requests and one or more segregated closed flow requests, and a combination of open and closed flow requests;
executing one or more performance tests with said one or more invoked APIs based on said one or more workload characteristics;
concurrently measuring utilization of one or more resources of said one or more systems and computing one or more service demands of each of said one or more resources;
executing said one or more performance tests with said one or more invoked APIs based on a volume of workload characteristics pertaining to said one or more applications; and
predicting, using a queuing network, performance of said one or more applications for said volume of workload characteristics.

14. The one or more non-transitory machine readable information storage mediums of claim 13, wherein the step of executing said one or more performance tests with said one or more invoked APIs comprises:
varying one or more input parameters of said one or more invoked APIs; and
determining variation in said one or more service demands based on said one or more varied input parameters.

15. The one or more non-transitory machine readable information storage mediums of claim 14, wherein said variation in said one or more service demands is indicative of said performance of said one or more applications for said volume of workload characteristics.

16. The one or more non-transitory machine readable information storage mediums of claim 14, wherein said variation in said one or more service demands is determined based on at least one of (i) number of sensor observations and (ii) number of user requests obtained by said IoT platform.

17. The one or more non-transitory machine readable information storage mediums of claim 13, wherein said one or more service demands are computed from said measured utilization of said one or more resources, and number of user requests processed by said IoT platform per unit time.

18. The one or more non-transitory machine readable information storage mediums of claim 13, further comprising:
generating a log comprises details pertaining to said one or more sensor observations being obtained by said IoT platform from said one or more sensors, wherein said details comprises time-stamp values of arrivals of each of said one or more sensor observations;
obtaining, based on said time-stamp values, one or more samples for inter-arrival time of sensor observations over a pre-defined duration;
segregating said one or more samples into one or more time intervals; and
deriving one or more inter-arrival distributions of said one or more sensor observations upon said one or more samples being segregated into said one or more time intervals.

* * * * *